(12) United States Patent
Harrison et al.

(10) Patent No.: US 10,838,696 B2
(45) Date of Patent: Nov. 17, 2020

(54) MANAGEMENT OF L-SHAPED SWIM LANES OF VARIABLE HEIGHTS AND WIDTHS IN A GRAPHICAL EDITOR USED TO REPRESENT MULTIPLE ASYNCHRONOUS PROCESS IN THE SAME VIEW

(71) Applicant: International Business Machines Corporation, Armonk, NY (US)

(72) Inventors: Ashley Harrison, Southampton (GB); Doina L. Klinger, Winchester (GB); Chengxuan Xing, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/155,001

(22) Filed: Oct. 9, 2018

(65) Prior Publication Data
US 2020/0110583 A1 Apr. 9, 2020

(51) Int. Cl.
*G06F 8/20* (2018.01)
*G06F 3/0484* (2013.01)
*G06F 3/0482* (2013.01)

(52) U.S. Cl.
CPC .............. *G06F 8/20* (2013.01); *G06F 3/0482* (2013.01); *G06F 3/04845* (2013.01)

(58) Field of Classification Search
USPC ........................................................ 717/105
See application file for complete search history.

(56) References Cited

U.S. PATENT DOCUMENTS

| 8,930,833 | B2 | 1/2015 | Levin et al. | |
|---|---|---|---|---|
| 9,846,849 | B2 | 12/2017 | Damonte et al. | |
| 2009/0293074 | A1* | 11/2009 | Rohwer | G06Q 10/06 |
| | | | | 719/328 |
| 2012/0079408 | A1 | 3/2012 | Rohwer | |
| 2012/0210295 | A1* | 8/2012 | Crisp | G06F 8/10 |
| | | | | 717/105 |
| 2014/0365938 | A1 | 12/2014 | Black et al. | |

(Continued)

OTHER PUBLICATIONS

Jeyaraj et al., "Validation of Business Process Models Using Swimlane Diagrams", Journal of Information Technology Management vol. XXV, No. 4, 2014, 11pg. (Year: 2014).*

(Continued)

*Primary Examiner* — Ryan D. Coyer
(74) *Attorney, Agent, or Firm* — Stephen R. Tkacs; Stephen J. Walder, Jr.; Alexander Jochym (57) ABSTRACT

A mechanism is provided in a data processing system having a processor and a memory. The memory comprises instructions which are executed by the processor to cause the processor to implement a graphical editor for managing L-shaped swim lanes in a graphical view of an application process. The graphical editor receives a data serialization file representing a process flow of a software application. The graphical editor renders each synchronous node in the process flow in the graphical view of the application process. A swim lane rendering engine executing within the graphical editor creates an L-shaped swim lane for each asynchronous node in the process flow in the graphical view of the application process. The graphical editor presents the graphical view of the application process via an output device.

20 Claims, 7 Drawing Sheets

(56) References Cited

U.S. PATENT DOCUMENTS

| | | | |
|---|---|---|---|
| 2015/0082221 A1* | 3/2015 | Noel | G06F 3/0481 |
| | | | 715/771 |
| 2015/0082271 A1* | 3/2015 | Damonte | G06F 8/10 |
| | | | 717/105 |
| 2015/0363416 A1* | 12/2015 | Kritt | G06F 16/16 |
| | | | 707/822 |
| 2016/0314351 A1 | 10/2016 | Mos et al. | |
| 2018/0039513 A1* | 2/2018 | Zhao | G06F 9/542 |
| 2018/0081994 A1 | 3/2018 | Ron et al. | |

OTHER PUBLICATIONS

"Swim Lane Diagrams", Concept Draw, http://www.conceptdraw.com/examples/visio-examples-process-flow-with-swim-lanes, Downloaded for the internet on Aug. 20, 2018, 20 pages.

"Swim Lane Diagrams", yEd Graph Editor Manual, https://yed.yworks.com/support/manual/swimlane.html, Downloaded from internet on Aug. 20, 2018, 1 page.

"Welcome to swimlanes.io", https://swimlanes.io/, Downloaded from the internet on Aug. 20, 2018, 1 page.

Bauer, Bernhard et al., "A Decentralized Broker Architecture for Collaborative Business Process Modelling and Enactment", Chapter from the book: Enterprise Interoperability: New Challenges and Approaches, Jan. 2007, 10 pages.

* cited by examiner

MANAGEMENT OF L-SHAPED SWIM LANES OF VARIABLE HEIGHTS AND WIDTHS IN A GRAPHICAL EDITOR USED TO REPRESENT MULTIPLE ASYNCHRONOUS PROCESS IN THE SAME VIEW

BACKGROUND

The present application relates generally to an improved data processing apparatus and method and more specifically to mechanisms for management of L-shaped swim lanes of variable heights and widths in a graphical editor used to represent multiple asynchronous processes in the same view.

An integrated development environment (IDE) is a software application that provides comprehensive facilities to computer programmers for software development. An IDE normally consists of a source code editor, build automation tools, and a debugger. Sometimes an IDE includes an integrated version control system or various tools to simplify the construction of a graphical user interface (GUI). Many modern IDEs also have a class browser, an object browser, and a class hierarchy diagram, for use in object-oriented software development.

A visual programming language (VPL) is any programming language that lets users create programs by manipulating program elements graphically rather than by specifying them textually. A VPL allows programming with visual expressions, spatial arrangements of text and graphic symbols, used either as elements of syntax or secondary notation. For example, many VPLs (known as dataflow or diagrammatic programming) are based on the idea of boxes and arrows, where boxes or other screen objects are treated as entities, connected by arrows, lines or arcs that represent relations.

A swim lane is used in process flow diagrams or flowcharts that visually distinguish job sharing and responsibilities for sub-processes of a business process. Swim lanes may be arranged either horizontally or vertically. The swim lane flowchart differs from other flowcharts in that processes and decisions are grouped visually by placing them in lanes. Parallel lines divide the chart into lanes, with one lane for each person, group or sub-process. Lanes are labelled to show how the chart is organized.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system having a processor and a memory, wherein the memory comprises instructions which are executed by the processor to cause the processor to implement a graphical editor for managing L-shaped swim lanes in a graphical view of an application process. The method comprises receiving, by the graphical editor, a data serialization file representing a process flow of a software application. The method further comprises rendering, by the graphical editor, each synchronous node in the process flow in the graphical view of the application process. The method further comprises creating, by a swim lane rendering engine executing within the graphical editor, an L-shaped swim lane for each asynchronous node in the process flow in the graphical view of the application process. The method further comprises presenting, by the graphical editor, the graphical view of the application process via an output device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Swim lanes have been used to describe complicated processes with multiple participants. They are used as a way of describing the responsibilities of sub-processes of the main processing, whether a business process or a program. Swim lanes are used to group sub-processes or tasks according to obligations of certain resources or roles.

A variety of graphical editors are available that assist the user with the job of selecting blocks and connecting them to achieve a certain goal. Among these are various integration products where the basic blocks represent an interaction with an external system or a sub-processing unit (subflow). When the integration flow becomes more complex, certain composition features are required in the graphical editor.

In a freeform solution, a user can move nodes and their connections in any way to represent at a glance the order and type of execution and containment. Using multiple views, a user can see the main view and then navigate to different views to see sub-processes. In a "boxes inside a box" solution, certain blocks in a flow—the sub-flows—might expand to contain other blocks. This is a good representation for synchronous processing. The blocks in the big box must be executed before the block following the big box executes. In other situations, the editor shows the containment without representing the execution type (synchronous or asynchronous). Regular swim lanes have been used to depict a "special" path of execution, such as error paths.

The illustrative embodiments introduce the concept of L-shaped swim lanes for batch processing nodes. This has a number of advantages making clear the point in the execution where a parallel path has been started, the flow and execution border between threads, and the containment relationships. This model also brings a number of challenges to the implementation of the editor. No connection wires should be crossed, no nodes from parallel execution processes should overlap, the editor should support a large number of nodes spawning asynchronous processes, and the parallel execution flows must be clearly visible. In a mix of synchronous and asynchronous interactions that map in the editor to boxes in boxes and L-shaped swim lane model, respectively, the L-shaped swim lanes must be managed. Their position, height of the vertical part of the "L" and the width of the horizontal part of the "L" must be constantly reevaluated, depending on other nodes of the flow, either before or after the node, or any nodes added to its asynchronous process.

The illustrative embodiments manage the nodes in the flow by assigning them to groups that satisfy certain constraints, such as styling rules applied to each group. This ensures that the swim lanes are correctly rendered with dedicated, non-overlapping areas for each L-shaped swim lane. The constraints that a group would satisfy are as follows: each group has any number of synchronous nodes and zero or one asynchronous nodes; the asynchronous node, if present, is the last node of the group; an asynchronous node starts a new group for its asynchronous branch; and, an asynchronous node starts a new group for the nodes that succeed it in the branch to which it has been added.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
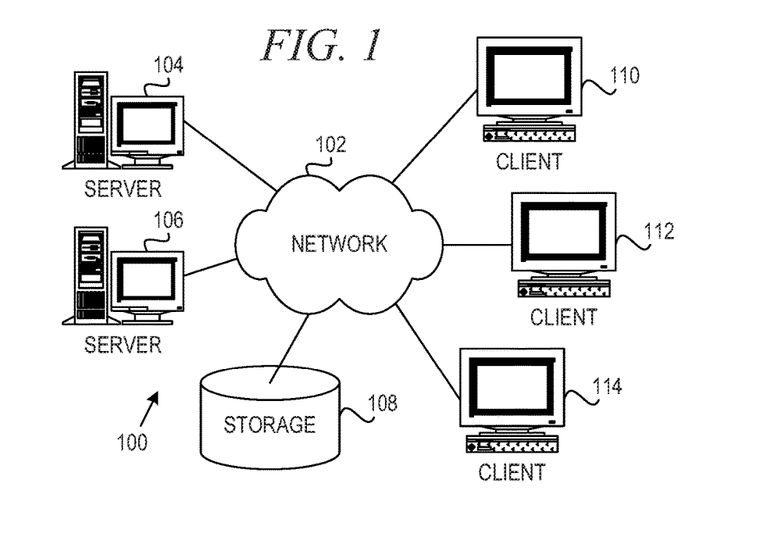
FIG. 1 is an example diagram of a distributed data processing system in which aspects of the illustrative embodiments may be implemented.
Figure 2:
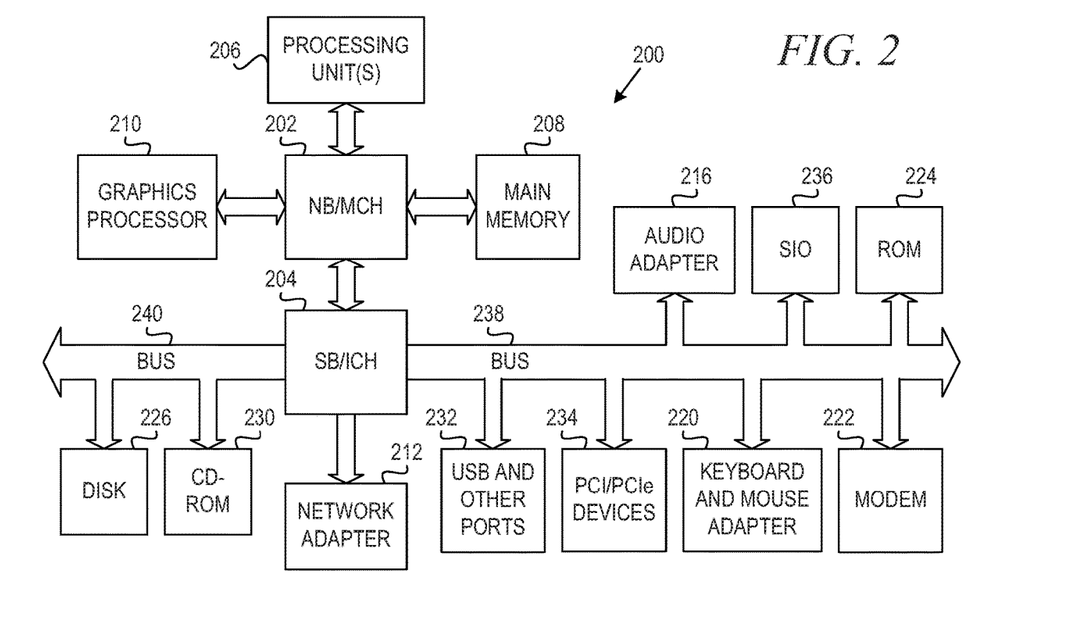
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a swim lane rendering engine for management of L-shaped swim lanes of variable heights and widths in a graphical editor of an integrated development environment. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates representing multiple asynchronous processes in a view of a graphical editor of an integrated development environment.

As noted above, the mechanisms of the illustrative embodiments utilize specifically configured computing devices, or data processing systems, to perform the operations for managing L-shaped swim lanes of variable heights and widths in a graphical editor to represent asynchronous processes. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the swim lane rendering engine for managing L-shaped swim lanes of variable heights and widths to represent multiple asynchronous processes in the same view.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3A:
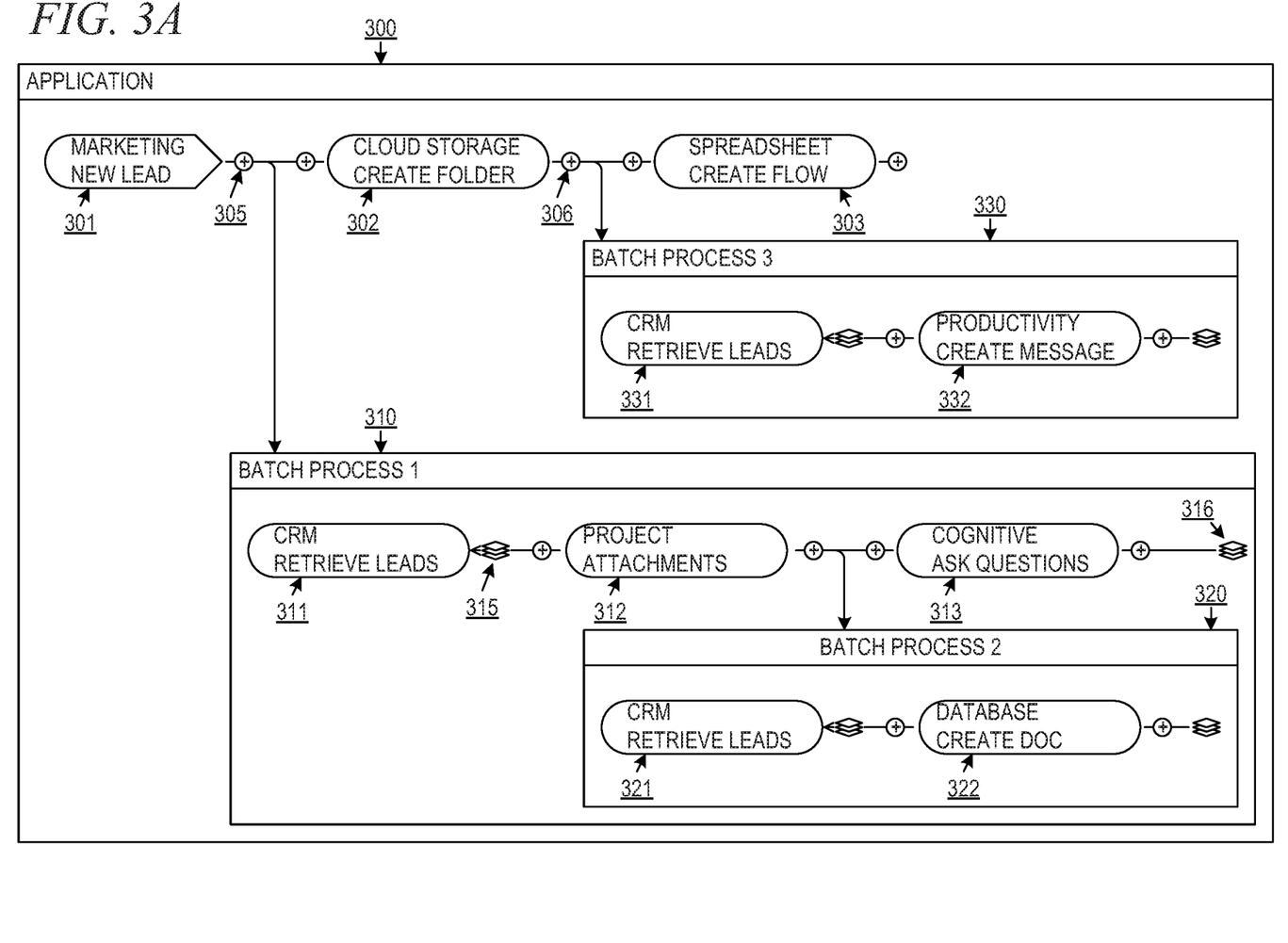
FIGS. 3A-3C depict an example of a graphical editor display with L-shaped swim lanes to represent multiple asynchronous processes in accordance with an illustrative embodiment.
Figure 3B:
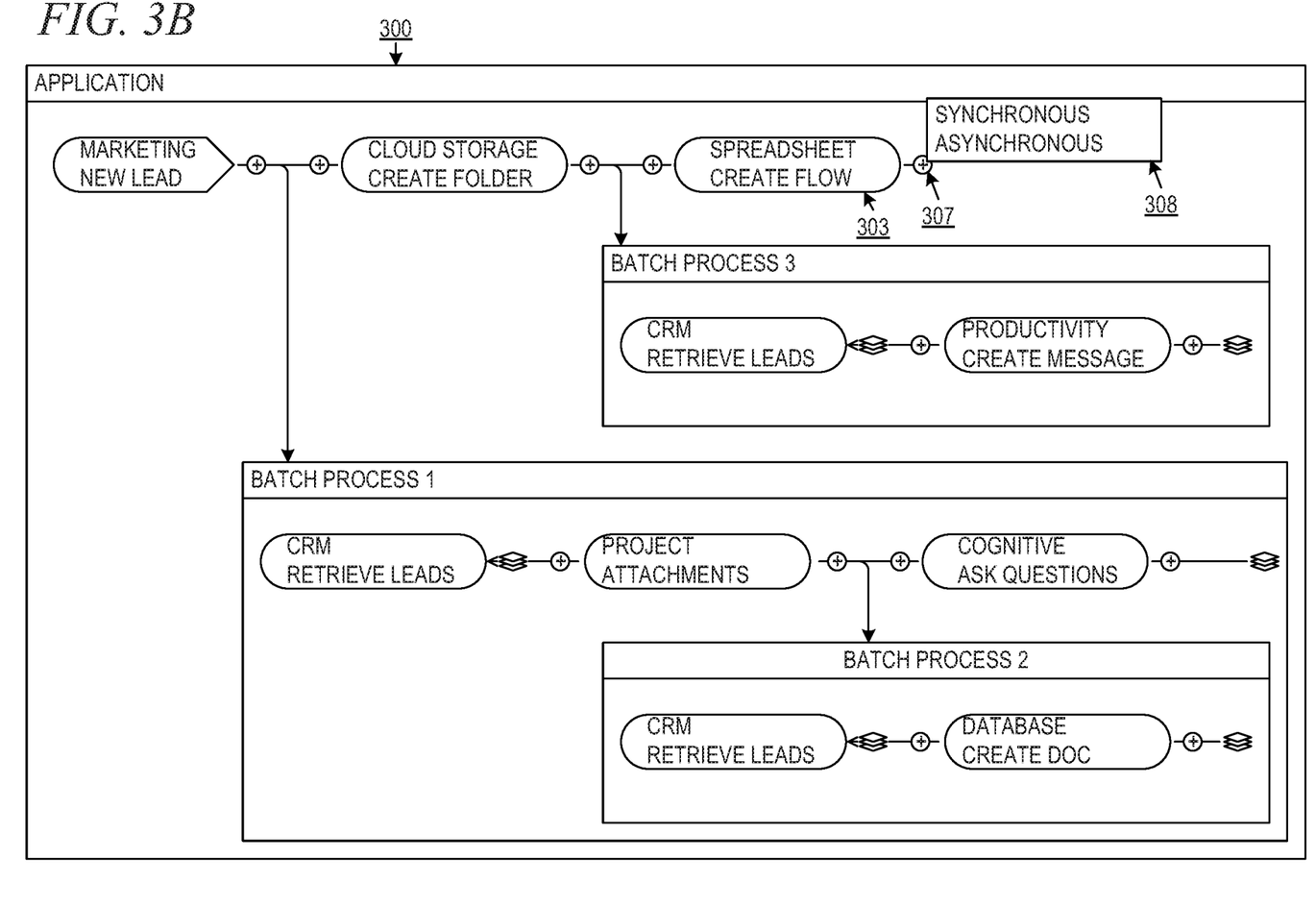
Figure 3C:
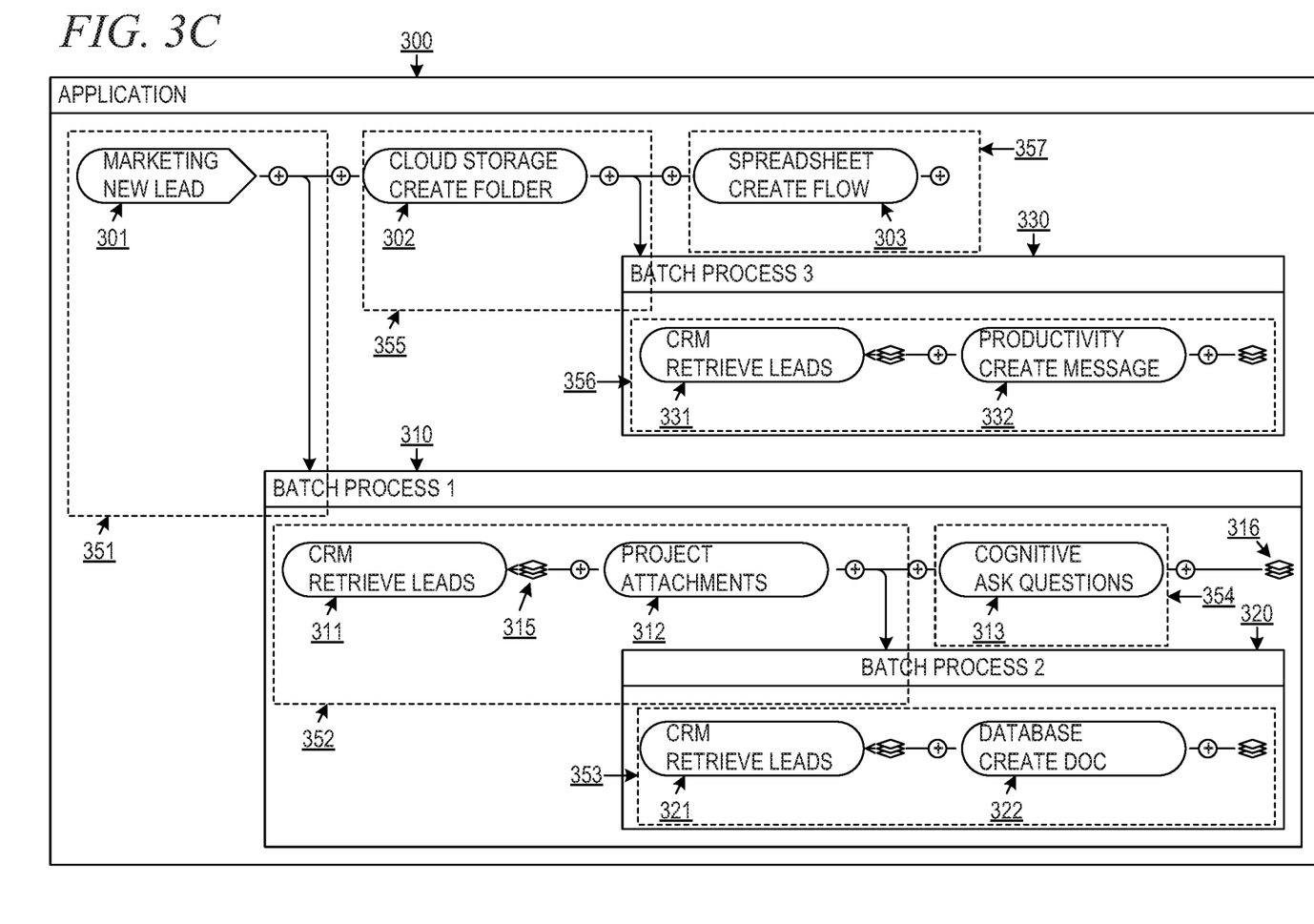

FIGS. 3A-3C depict an example of a graphical editor display with L-shaped swim lanes to represent multiple asynchronous processes in accordance with an illustrative embodiment. As shown in FIG. 3A, the graphical editor display 300 presents an application that includes a plurality of nodes 301, 302, 303, and batch processes 310, 320, 330. Each node represents a block of programming code that performs some processing or calls a service, such as a cloud service. For example, node 301, the root node of the application, calls a marketing service to generate a new sales lead. The marketing service may be a cloud service, such as the Marketo® marketing service. Node 301 represents a synchronous process. After node 301 completes, the application spawns batch process 1 310, which is an asynchronous process. Because node 301 is synchronous, node 301 must complete before batch process 1 310 begins. Because batch process 1 310 is asynchronous, the remaining nodes in the top level (node 302, batch process 3 330, and node 303) execute concurrently with batch process 1 310.

Within batch process 1 310, the root node 311 represents a block of programming code that calls a customer relationship management (CRM) service to retrieve sales leads. The nodes between icon 315 and icon 316 in the process flow occur for each retrieved sales lead in parallel. Thus, the application executes node 312, batch process 2 320, and node 313 for each retrieved sales lead. Nodes 311, 312 are synchronous, meaning node 311 must complete before node 312 begins, and node 312 must complete before beginning batch process 2 320. Because batch process 2 320 is asynchronous, batch process 2 320 executes concurrently with node 313.

At the top level, while batch process 1 310 executes, node 302 executes in parallel. In the depicted example, node 302 calls a cloud storage service to create a folder. Because node 302 is synchronous, node 302 must complete execution before batch process 3 330 executes. Because batch process 3 330 is asynchronous, batch process 3 330 executes concurrently with node 303, which calls a cloud spreadsheet service to create a flow. Within batch process 3 330, root node 331 calls a CRM service to retrieve sales leads. Node 332 executes in parallel for each retrieved sales lead retrieved in block 331.

In the depicted example, each asynchronous node spawns a batch process, which is represented in graphical editor display 300 as an L-shaped swim lane. That is, the vertical portion of the "L" is an arrow from the process flow to the batch process, and the horizontal portion of the "L" contains the nodes of the batch process. The swim lane rendering engine of the illustrative embodiment automatically adjusts the length of the vertical portion of "L", i.e., the arrow, to accommodate the other nodes in the process. The swim lane rendering engine also automatically adjusts the height and width of the batch process box to accommodate the nodes and other batch processes within the batch process.

In accordance with the illustrative embodiment, a user may interact with graphical editor display 300 to manipulate the process flow of the application. For example, the user may move nodes or batch processes around the process flow. For instance, the user may move node 303 to appear just before or just after node 302. As another example, graphical editor display 300 includes add controls 305, 306 for adding nodes to the process flow.

Turning to FIG. 3B, a user selects add control 307 to add a node just after node 303. Selecting control 307, for example, causes a node type menu 308 to be created listing the types of node to be added (i.e., synchronous or asynchronous). If the user selects the synchronous type, then graphical editor display 300 would add a synchronous node to the process flow. If the user selects the asynchronous type, then the swim lane rendering engine creates an L-shaped swim lane with the appropriate height and width to fit in the process flow.

Figure 4:
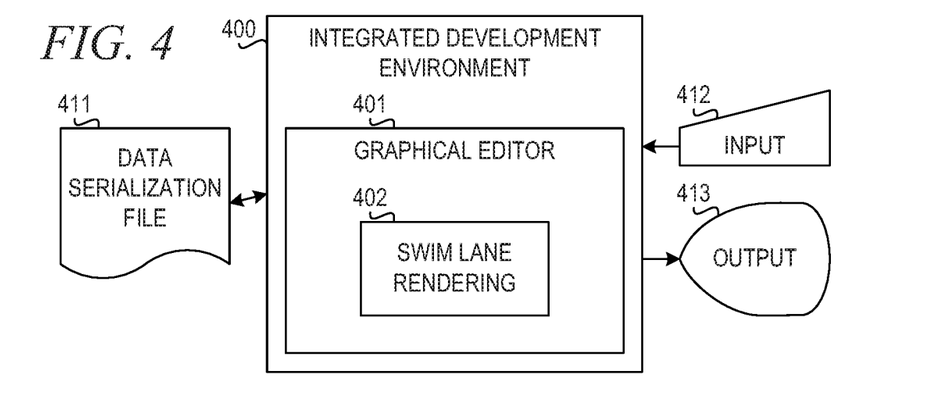
FIG. 4 is a block diagram illustrating an integrated development environment in accordance with an illustrative embodiment.

FIG. 4 is a block diagram illustrating an integrated development environment in accordance with an illustrative embodiment. Integrated development environment 400 includes graphical editor 401, which provides graphical tools for adding, removing, connecting, and configuring nodes representing portions of application code. The user interacts with graphical editor 401 using input device 412, and graphical editor 401 renders the application process visually on output device 413. In accordance with the illustrative embodiment, integrated development environment 400 also includes swim lane rendering engine 402, which renders asynchronous nodes or batch processes as L-shaped swim lanes with variable heights and widths.

Integrated development environment 400 receives and modifies data serialization file 411. The data serialization file 411 is a human-readable representation of the application as a configuration of program portions or service calls. In one embodiment, data serialization file 411 is a YAML file. "YAML" once stood for "yet another markup language" but now stands for "YAML ain't markup language." The latter is a reference to both the idea that YAML does not actually markup content and the idea that YAML allows for nested structures. In another embodiment, data serialization file 411 is a Java Script Object Notation (JSON) file. JSON is an open-standard file format that uses human-readable text for data objects consisting of attribute-value pairs and array data types (or any other serializable value).

In accordance with the illustrative embodiment, swim lane rendering engine 402 manages nodes in the flow of data serialization file 411 by assigning them to groups that satisfy certain constraints that ensure that the swim lanes are correctly rendered with dedicated, no-overlapping areas for each L-shape swim lane. The constraints that a group must satisfy are as follows: each group has any number of synchronous nodes and zero or one asynchronous nodes; the asynchronous node, if present, is the last node in the group; an asynchronous node starts a new group for its asynchronous branch; and, an asynchronous node starts a new group for the nodes that succeed it in the branch to which it has been added.

With reference to FIG. 3C, the first top-level group 351 begins with node 301 and ends with the asynchronous node representing batch process 1 310. This asynchronous node starts a new group 352 with node 311 in batch process 1 310. Group 352 includes node 311, node 312, and ends with the asynchronous node for batch process 2 320. Batch process 2 320 starts a new group 353 including node 321 and node 322. The asynchronous node for batch process 2 320 also starts a new group 354 including the succeeding node 313.

The asynchronous node for batch process 1 310 also starts a new group 355 for the succeeding nodes in the top level, including node 302 and the asynchronous node representing batch process 3 330. This asynchronous node starts a new group 356 including nodes 331, 332 and a new group for succeeding node 303.

Given a node group, swim lane rendering engine 402 navigates from left to right. If a node is asynchronous, swim lane rendering engine 402 stops rendering subsequent nodes in the current group, and the last node rendered will be the asynchronous node. Swim lane rendering engine 402 gives any nodes subsequent to the asynchronous node to render at the top level. Swim lane rendering engine 402 then executes recursively for this new group and also executes recursively for the asynchronous node group. In this manner, swim lane rendering engine 402 is capable of rendering concurrent sub-processes and nested node groups.

In the example shown in FIGS. 3A-3C, there are two L-shaped swim lanes (batch processes 310, 320) defined from the same level and one L-shaped swim lane (batch process 330) nested inside another L-shaped swim lane (batch process 310).

The top level node group can be represented as follows: [node 301, batch process 1 310, node 302, batch process 3 330, node 303]. Following the algorithm, swim lane rendering engine 402 renders node 301 and batch process 1 310 and then stops. Swim lane rendering engine 402 renders batch process 1 310 by creating an L-shaped swim lane. The succeeding node group is then as follows: [node 302, batch process 3 330, node 303]. Swim lane rendering engine 402 repeats the algorithm to render only node 302 and batch process 3 330 and stops. Swim lane rendering engine 402 renders batch process 3 330 as an L-shaped swim lane. The succeeding node group is then as follows: [node 303]. Swim lane rendering engine 402 can then render node 303.

The batch process 3 330 node group is as follows: [node 331, node 332]. Swim lane rendering engine 402 renders these nodes in the batch process 3 330 asynchronous node group.

The batch process 1 310 node group is as follows: [node 311, node 312, batch process 2 320, node 313]. In the batch process 1 310 node group, swim lane rendering engine 402 renders node 311, node 312, and batch process 2 320 and stops. The succeeding node group is then as follows: [node 313]. Swim lane rendering engine 402 renders this node at the top level of batch process 1 310.

The batch process 2 320 node group is as follows: [node 321, node 322]. Swim lane rendering engine 402 renders node 321 and node 322 in the batch process 2 320 swim lane.

Swim lane rendering engine 402 follows this method to render nodes in the application process with L-shaped swim lanes, including nested swim lanes and sub-processes, based on data serialization file 411. As the user interacts with the rendered process using input device 412, graphical editor 401 modifies the corresponding code in data serialization file 411. For example, if the user adds a synchronous node to the application process, then graphical editor 401 adds the corresponding code to data serialization file 411 with the appropriate indentation for nested nodes and sub-processes. As another example, if the user moves a batch process from inside another batch process to another level of the application process flow, then graphical editor 401 modifies data serialization file 411 to reflect this change.

Figure 5:
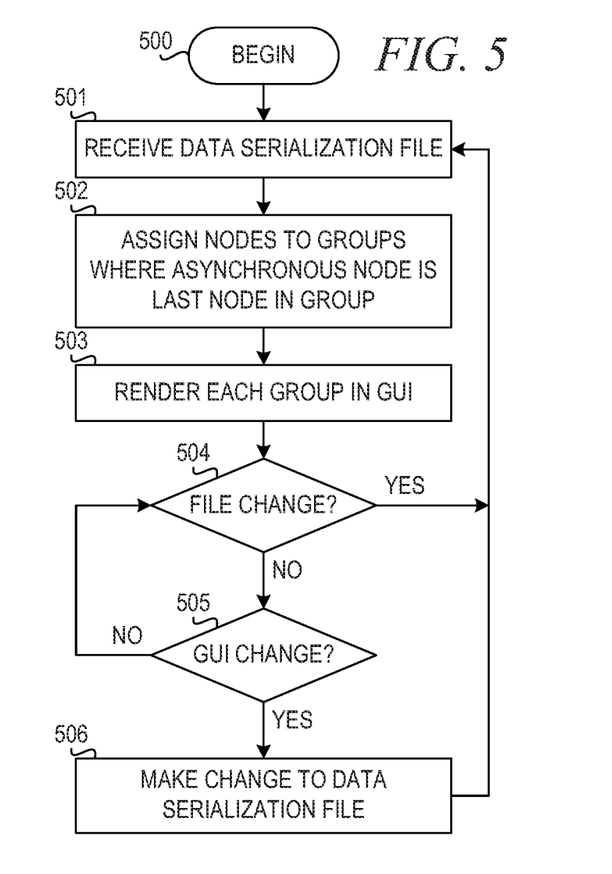
FIG. 5 is a flowchart illustrating operation of a graphical editor with swim lane rendering engine in an application process view in accordance with an illustrative embodiment.

FIG. 5 is a flowchart illustrating operation of a graphical editor with swim lane rendering engine in an application process view in accordance with an illustrative embodiment. Operation begins (block 500), and the graphical editor receives a data serialization file (block 501). The swim lane rendering engine assigns nodes from the data serialization file to groups where each group contains has any number of synchronous nodes and zero or more asynchronous nodes and the asynchronous node, if present, is the last node in the group (block 502). The swim lane rendering engine then starts a new group for its asynchronous branch and starts a new group for the nodes that succeed the asynchronous branch to which the swim lane had been added.

The swim lane rendering engine and graphical editor then render each group in the graphical user interface (GUI) (block 503). The swim lane rendering engine creates an L-shaped swim lane with variable height and width for each asynchronous node and corresponding sub-process. The swim lane rendering engine adjusts the length of the arrow to the batch process component and adjusts the height and weight based on the nodes in the sub-process of the asynchronous node. The graphical editor determines whether there is a change to the data serialization file (block 504). If there is a change to the data serialization file, then operation returns to block 501 to render the updated application process in the GUI.

If there is no change to the data serialization file in block 504, the graphical editor determines whether there is a change to the graphical components representing the process in the GUI (block 505). If there is no change in the GUI, then operation returns to block 504 to determine whether there is a change to the data serialization file. If there is a change to the application process in the GUI in block 505, then the graphical editor makes changes to the data serialization file based on the changes to the application process in the GUI (block 506). Thereafter, operation returns to block 501 to continue rendering the application process in the GUI.

Figure 6:
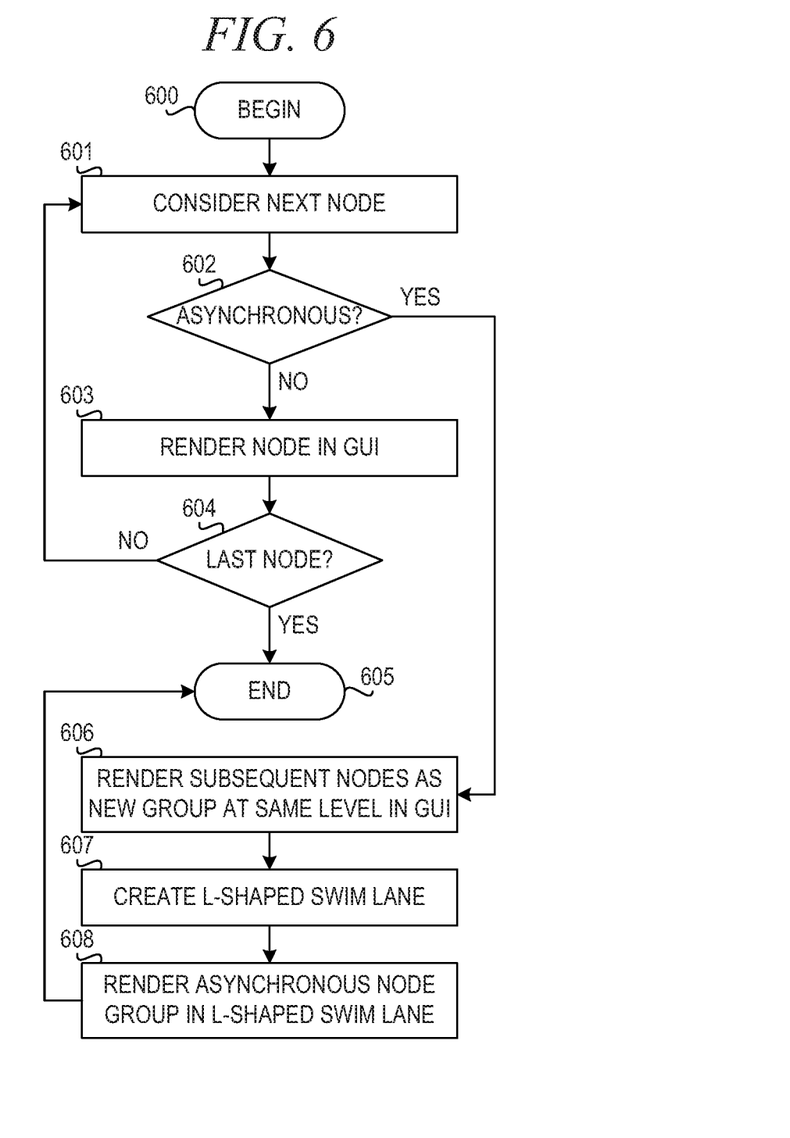
FIG. 6 is a flowchart illustrating operation of a graphical editor with swim lane rendering engine for managing L-shaped swim lanes representing asynchronous processes in an application process view in accordance with an illustrative embodiment.

FIG. 6 is a flowchart illustrating operation of a graphical editor with swim lane rendering engine for managing L-shaped swim lanes representing asynchronous processes in an application process view in accordance with an illustrative embodiment. Operation begins (block 600), and the swim lane rendering engine considers the first node (block 601) and determines whether the node is asynchronous (block 602). If the node is synchronous, then the swim lane rendering engine renders the node in the GUI (block 603). The swim lane rendering engine then determines whether the node is the last node in the process (block 604). If it is the last node in the process, then operation ends (block 605). If the node is not the last node, then operation returns to block 601 to consider the next node in the process.

If the node is asynchronous in block 602, then the rendering engine renders subsequent nodes at the same level in the GUI (block 606). This is a recursive process; therefore, swim lane rendering engine gives the subsequent nodes in the process to a new group and repeats the process of FIG. 6 for those nodes. Then, the swim lane rendering engine creates an L-shaped swim lane (block 607) and renders the asynchronous node group in the L-shaped swim lane (block 608). Again, this is a recursive process; therefore, the swim lane rendering engine forms the group of nodes for the nodes associated with the asynchronous node. In one embodiment, an asynchronous node represents a batch process (sub-process) that comprises one or more nodes. The rendering engine forms a group including the nodes of the sub-process and repeats the process of FIG. 6 for the asynchronous node group. Thereafter, operation ends (block 605).

Figure 7:
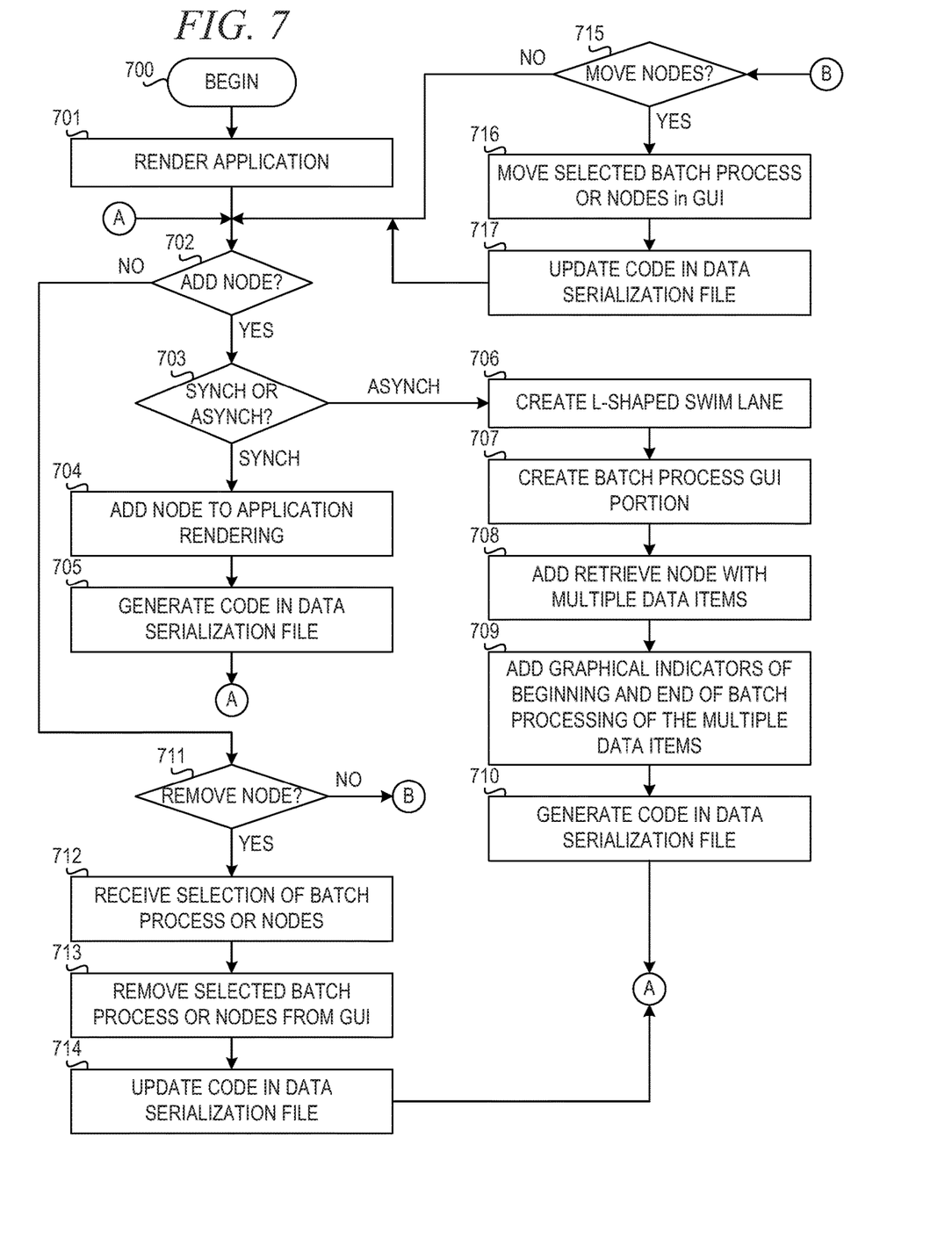
FIG. 7 is a flowchart illustrating operation of a graphical editor with swim lane rendering engine for managing nodes an application process view in accordance with an illustrative embodiment.

FIG. 7 is a flowchart illustrating operation of a graphical editor with swim lane rendering engine for managing nodes an application process view in accordance with an illustrative embodiment. Operation begins (block 700), and the graphical editor and swim lane rendering engine render the application process (block 701). The graphical editor determines whether a user adds a node to the process (block 702). If a user adds a node, then the graphical editor determines whether the node is a synchronous node or an asynchronous node (block 703). If the node is a synchronous node, then the graphical editor adds the node to the application process rendering (block 704) and generates the corresponding code in a data serialization file (block 705). The graphical editor also automatically adds an "add node" control after the added node in the GUI. The graphical editor allows the user to interact with the added node to define the content of the node. For example, the user may provide program code or define a service call. The user may add a node that generates a new sales lead, creates a folder in a cloud storage service, creates a message or document, retrieves an attachment, or submits one or more questions to a cognitive system. Thereafter, operation returns to block 702 to determine whether the user adds another node to the process.

If the node is asynchronous in block 703, then the swim lane rendering engine creates an L-shaped swim lane for the asynchronous node (block 706). The swim lane rendering engine creates a batch process GUI portion (block 707) and adds a retrieve node with multiple data items to the batch process GUI portion (block 708). The swim lane rendering engine adds graphical indicators of the beginning and end of the batch processing of the multiple data items to the batch process GUI portion in association with the retrieve node (block 709). The graphical editor also automatically adds an "add node" control between the beginning and end graphical indicators associated with the retrieve node in the GUI. Then, the graphical editor generates code for the added asynchronous batch process in the data serialization file (block 710). Thereafter, operation returns to block 702 to determine whether the user adds another node to the process.

If the user does not add a node in block 702, then the graphical editor determines whether the user removes a node from the process in the GUI (block 711). If the user removes a node, then the graphical editor receives a selection of the batch process or one or more nodes being removed (block 712). The graphical editor removes the selected batch process or nodes from the GUI (block 713) and updates the code in the data serialization file to reflect the removed batch process or nodes (block 714). Thereafter, operation returns to block 702 to determine whether the user adds another node to the process.

If the user does not remove a node in block 711, then the graphical editor determines whether the user moves a batch process or one or more nodes in the process in the GUI (block 715). If the user moves a batch process or node, then the graphical editor moves the selected batch process or nodes in the GUI (block 716) and updates the code in the data serialization file to reflect the moved batch process or nodes (block 717). Thereafter, operation returns to block 702 to determine whether the user adds another node to the process.

Thus, the illustrative embodiments provide mechanisms for managing L-shaped swim lanes of variable height and width in a graphical editor. The mechanisms group the nodes in sets such that either have no asynchronous nodes and all nodes in a swim lane, an asynchronous node is the last node of the group, or the group has been defined by the asynchronous branch of an asynchronous node where each group has styling rules that render the swim lane groups. The illustrative embodiments allow a user to get an understanding at first glance of the various threads of execution of an integration flow.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a graphical editor for managing L-shaped swim lanes in a graphical view of an application process, the method comprising:
   receiving, by the graphical editor, a data serialization file representing a process flow of a software application as a configuration of program portions or service calls;
   assigning, by the swim lane rendering engine, nodes in the process flow of the software application to groups, wherein each group has one or more synchronous nodes and zero or one asynchronous node, wherein for a given group having a given asynchronous node the given asynchronous node is the last node of the given group, wherein the swim lane rendering engine assigns nodes of an asynchronous branch for the given asynchronous node to an asynchronous group, and wherein the swim lane rendering engine assigns zero or more nodes succeeding the asynchronous node to a succeeding group;
   rendering, by the graphical editor, each synchronous node in the given group at a first level in the graphical view of the application process;
   creating, by a swim lane rendering engine executing within the graphical editor, an L-shaped swim lane for the given asynchronous node from the first level to a second level in the graphical view of the application process;
   rendering, by the graphical editor, each node in the asynchronous group within the L-shaped swim lane at the second level in the graphical view of the application process;
   rendering, by the graphical editor, each node in the succeeding group after the L-shaped swim lane at the first level in the graphical view of the application process; and
   presenting, by the graphical editor, the graphical view of the application process via an output device.

2. The method of claim 1, further comprising:
   creating a first L-shaped swim lane for a first asynchronous node representing a first batch process, wherein the first batch process comprises at least one synchronous node and a second asynchronous node; and
   creating a second L-shaped swim lane for the second asynchronous node, wherein the second asynchronous node represents a second batch process, wherein the second L-shaped swim lane is nested within the first L-shaped swim lane.

3. The method of claim 1, wherein each L-shaped swim lane comprises an arrow in a vertical portion of the L-shaped swim lane and a batch process box in a horizontal portion of the L-shaped swim lane, wherein the batch process box comprises one or more nodes of a batch process associated with its corresponding asynchronous node.

4. The method of claim 3, wherein a given L-shaped swim lane comprises a batch node representing retrieving multiple data items, wherein the graphical view of the application process comprises a batch begin indicator and a batch end indicator in association with the batch node, and wherein one or more nodes appearing between the batch begin indicator and the batch end indicator are performed in parallel for the multiple data items.

5. The method of claim 1, further comprising:
   responsive to a user making changes to the data serialization file, modifying the graphical view of the application process based on the changes to the data serialization file.

6. The method of claim 1, further comprising:
   responsive to the user making changes to the graphical view of the application process, modifying the data serialization file based on the changes to the graphical view of the application process.

7. The method of claim 1, wherein the graphical view of the application process comprises a node addition control after each node, the method further comprising:
   responsive to a user selecting a given node addition control after a given node, creating a node type menu in association with the given node addition control, wherein the node type menu includes a synchronous node type and an asynchronous node type;
   responsive to the user selecting the synchronous node type, creating a synchronous node after the given node in the graphical view; and
   responsive to the user selecting the asynchronous node type, creating an L-shaped swim lane after the given node in the graphical view.

8. The method of claim 1, further comprising:
   responsive to a user removing a given node from the graphical view, removing code associated with the given node from the data serialization file.

9. A computer program product comprising a computer readable storage medium having a computer readable program stored therein, wherein the computer readable program, when executed on a computing device, causes the computing device to implement a graphical editor for managing L-shaped swim lanes in a graphical view of an application process, wherein the computer readable program causes the computing device to:

receive, by the graphical editor, a data serialization file representing a process flow of a software application as a configuration of program portions or service calls;

assign, by the swim lane rendering engine, nodes in the process flow of the software application to groups, wherein each group has one or more synchronous nodes and zero or one asynchronous node, wherein for a given group having a given asynchronous node the given asynchronous node is the last node of the given group, wherein the swim lane rendering engine assigns nodes of an asynchronous branch for the given asynchronous node to an asynchronous group, and wherein the swim lane rendering engine assigns zero or more nodes succeeding the asynchronous node to a succeeding group;

render, by the graphical editor, each synchronous node in the given group at a first level in the graphical view of the application process;

create, by a swim lane rendering engine executing within the graphical editor, an L-shaped swim lane for the given asynchronous node from the first level to a second level in the graphical view of the application process;

render, by the graphical editor, each node in the asynchronous group within the L shaped swim lane at the second level in the graphical view of the application process;

render, by the graphical editor, each node in the succeeding group after the L-shaped swim lane at the first level in the graphical view of the application process; and present, by the graphical editor, the graphical view of the application process; via an output device.

10. The computer program product of claim 9, wherein the computer readable program causes the computing device to:

create a first L-shaped swim lane for a first asynchronous node representing a first batch process, wherein the first hatch process comprises at least one synchronous node and a second asynchronous node; and create a second L-shaped swim lane for the second asynchronous node, wherein the second asynchronous node represents a second batch process, wherein the second L-shaped swim lane is nested within the first L-shaped swim lane.

11. The computer program product of claim 9, wherein each L-shaped swim lane comprises an arrow in a vertical portion of the L-shaped swim lane and a hatch process box in a horizontal portion of the L-shaped swim lane, wherein the batch process box comprises one or more nodes of a batch process associated with its corresponding asynchronous node.

12. The computer program product of claim 11, wherein a given L-shaped swim lane comprises a batch node representing retrieving multiple data items, wherein the graphical view of the application process comprises a batch begin indicator and a batch end indicator in association with the batch node, and wherein one or more nodes appearing between the batch begin indicator and the batch end indicator are performed in parallel for the multiple data items.

13. The computer program product of claim 9, wherein the computer readable program causes the computing device to:

responsive to a user making changes to the data serialization file, modify the graphical view of the application process based on the changes to the data serialization file.

14. The computer program product of claim 9, wherein the computer readable program causes the computing device to:

responsive to the user making changes to the graphical view of the application process, modify the data serialization file based on the changes to the graphical view of the application process.

15. The computer program product of claim 9, wherein the graphical view of the application process comprises a node addition control after each node, wherein the computer readable program causes the computing device to:

responsive to a user selecting a given node addition control after a given node, create a node type menu in association with the given node addition control, wherein the node type menu includes a synchronous node type and an asynchronous node type;

responsive to the user selecting the synchronous node type, create a synchronous node after the given node in the graphical view; and responsive to the user selecting the asynchronous node type, create an L-shaped swim lane after the given node in the graphical view.

16. The computer program product of claim 9, wherein the computer readable program causes the computing device to:

responsive to a user removing a given node from the graphical view, remove code associated with the given node from the data serialization file.

17. An apparatus comprising:
a processor; and
a memory coupled to the processor, wherein the memory comprises instructions which, when executed by the processor, cause the processor to implement a graphical editor for managing L-shaped swim lanes in a graphical view of an application process, wherein the instructions cause the processor to:

receive, by the graphical editor, a data serialization file representing a process flow of a software application as a configuration of program portions or service calls;

assign, by the swim lane rendering engine, nodes in the process flow of the software application to groups, wherein each group has one or more synchronous nodes and zero or one asynchronous node, wherein for a given group having a given asynchronous node the given asynchronous node is the last node of the given group, wherein the swim lane rendering engine assigns nodes of an asynchronous branch for the given asynchronous node to an asynchronous group, and wherein the swim lane rendering engine assigns zero or more nodes succeeding the asynchronous node to a succeeding group;

render, by the graphical editor, each synchronous node in the given group at a first level in the graphical view of the application process;

create, by a swim lane rendering engine executing within the graphical editor, an L-shaped swim lane for the given asynchronous node from the first level to a second level in the graphical view of the application process;

render, by the graphical editor, each node in the asynchronous group within the L-shaped swim lane at the second level in the graphical view of the application process;

render, by the graphical editor, each node in the succeeding group after the L-shaped swim lane at the first level in the graphical view of the application process; and present, by the graphical editor, the graphical view of the application process via an output device.

18. The apparatus of claim 17, wherein the graphical view of the application process comprises a node addition control after each node, wherein the instructions cause the processor to:

responsive to a user selecting a given node addition control after a given node, create a node type menu in association with the given node addition control, wherein the node type menu includes a synchronous node type and an asynchronous node type;

responsive to the user selecting the synchronous node type, create a synchronous node after the given node in the graphical view; and responsive to the user selecting the asynchronous node type, create an L-shaped swim lane after the given node in the graphical view.

19. The apparatus of claim 17, wherein each L-shaped swim lane comprises an arrow in a vertical portion of the L-shaped swim lane and a batch process box in a horizontal portion of the L-shaped swim lane, wherein the batch process box comprises one or more nodes of a batch process associated with its corresponding asynchronous node.

20. The apparatus of claim 19, wherein a given L-shaped swim lane comprises a batch node representing retrieving multiple data items, wherein the graphical view of the application process comprises a batch begin indicator and a batch end indicator in association with the batch node, and wherein one or more nodes appearing between the batch begin indicator and the batch end indicator are performed in parallel for the multiple data items.

* * * * *